United States Patent
Young et al.

(10) Patent No.: US 9,352,748 B2
(45) Date of Patent: *May 31, 2016

(54) SYSTEM, METHOD, AND COMPUTER SOFTWARE CODE FOR OPTIMIZING PERFORMANCE OF A POWERED SYSTEM

(71) Applicant: General Electric Company, Schenectady, NY (US)

(72) Inventors: Henry Todd Young, North East, PA (US); Ajith Kuttannair Kumar, Erie, PA (US); Bret Dwayne Worden, Lawrence Park, PA (US); Bertrand Bastien, Munich (DE); Timothy Warren Brown, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,605

(22) Filed: Apr. 10, 2015

(65) Prior Publication Data

US 2015/0210283 A1      Jul. 30, 2015

Related U.S. Application Data

(60) Continuation of application No. 14/170,920, filed on Feb. 3, 2014, now Pat. No. 9,026,349, which is a division of application No. 12/335,616, filed on Dec. 16, 2008, now Pat. No. 8,649,963.

(60) Provisional application No. 61/019,757, filed on Jan. 8, 2008.

(51) Int. Cl.
*G06F 19/00* (2011.01)
*B60W 30/14* (2006.01)

(Continued)

(52) U.S. Cl.
CPC .............. *B60W 30/143* (2013.01); *B60W 30/18* (2013.01); *B60W 30/188* (2013.01);

(Continued)

(58) Field of Classification Search
USPC .............................................. 701/123, 50, 19
See application file for complete search history.

(56) References Cited

U.S. PATENT DOCUMENTS 5,634,039 A * 5/1997 Simon et al. ..................... 703/18
6,052,644 A 4/2000 Murakami et al.

(Continued)

FOREIGN PATENT DOCUMENTS

CA     1266105 A     2/1990
JP     01501416 A    5/1989

(Continued)

OTHER PUBLICATIONS

US Non-Final Office Action issued in connection with corresponding U.S. Appl. No. 12/335,616 on Jan. 10, 2012.

(Continued)

*Primary Examiner* — Ruth Ilan
(74) *Attorney, Agent, or Firm* — GE Global Patent Operation

(57) ABSTRACT

A system to optimize performance of a powered system, the system including a data device configured to provide current information about current operating conditions of the powered system and/or prior information about the powered system, a controller configured to control operation of the powered system, and a processor configured to provide at least one control command to the controller for use in operating the powered system and/or user information with at least one recommended command to a user to control the powered system, wherein the at least one control command and/or user information are based at least in part on the current information and/or the prior information. A system and computer software code, stored on a computer readable media and executable with a processor, are also disclosed.

20 Claims, 2 Drawing Sheets

(51) Int. Cl.
  *G05B 13/02* (2006.01)
  *G05B 19/042* (2006.01)
  *B60W 30/18* (2012.01)
  *B60W 30/188* (2012.01)

(52) U.S. Cl.
  CPC .......... *G05B 13/024* (2013.01); *G05B 19/042* (2013.01); *B60W 2510/0638* (2013.01); *B60W 2510/0657* (2013.01); *B60W 2520/10* (2013.01); *B60W 2550/12* (2013.01); *B60W 2550/14* (2013.01); *B60W 2710/0644* (2013.01); *B60W 2710/0666* (2013.01); *G05B 2219/2616* (2013.01)

(56) References Cited

U.S. PATENT DOCUMENTS

| | | | |
|---|---|---|---|
| 6,216,071 | B1 | 4/2001 | Motz |
| 6,463,380 | B1 * | 10/2002 | Ablett et al. ................ 701/100 |
| 6,682,416 | B2 | 1/2004 | Behnke et al. |
| 7,898,403 | B2 | 3/2011 | Ritter et al. |
| 7,922,127 | B2 | 4/2011 | Kumar et al. |
| 8,229,631 | B2 * | 7/2012 | Morey et al. .................. 701/50 |
| 2005/0065674 | A1 | 3/2005 | Houpt et al. |
| 2006/0090379 | A1 * | 5/2006 | Furem ............................ 37/443 |
| 2006/0155447 | A1 | 7/2006 | Uken et al. |
| 2007/0129869 | A1 | 6/2007 | Gudat et al. |
| 2007/0219680 | A1 | 9/2007 | Kumar et al. |
| 2007/0219681 | A1 * | 9/2007 | Kumar et al. ................... 701/19 |
| 2007/0233364 | A1 * | 10/2007 | Kumar ........................ 701/200 |
| 2008/0183356 | A1 | 7/2008 | Kale et al. |
| 2008/0208393 | A1 * | 8/2008 | Schricker ........................ 701/1 |
| 2008/0319618 | A1 * | 12/2008 | Sjogren et al. ................. 701/50 |
| 2009/0062993 | A1 | 3/2009 | Morey et al. |
| 2009/0088961 | A1 | 4/2009 | Morey et al. |
| 2010/0131122 | A1 | 5/2010 | Dersjoe et al. |
| 2010/0198466 | A1 | 8/2010 | Eklund et al. |
| 2010/0332061 | A1 * | 12/2010 | Forsl w et al. ................. 701/22 |
| 2011/0077827 | A1 | 3/2011 | Arshad et al. |

FOREIGN PATENT DOCUMENTS

| | | |
|---|---|---|
| JP | 08177544 A | 7/1996 |
| JP | 11315556 A | 11/1999 |
| JP | 2006189054 A | 7/2006 |
| JP | 2007162914 A | 6/2007 |

OTHER PUBLICATIONS

Unofficial English translation of Japanese Office Action issued in connection with corresponding JP Application No. 2010541480 on Aug. 21, 2012.

Unofficial English translation of Japanese Office Action issued in connection with corresponding JP Application No. 2010541480 on Apr. 30, 2013.

Unofficial English translation of Japanese NOA issued in connection with corresponding JP Application No. 2010541480 on Aug. 20, 2013.

* cited by examiner

SYSTEM, METHOD, AND COMPUTER SOFTWARE CODE FOR OPTIMIZING PERFORMANCE OF A POWERED SYSTEM

CROSS-REFERENCE TO RELATED APPLICATIONS

This application is a continuation of U.S. patent application Ser. No. 14/170,920, filed Feb. 3, 2014, which is a divisional of U.S. patent application Ser. No. 12/335,616, filed Dec. 16, 2008, now U.S. Pat. No. 8,649,963 issued Feb. 11, 2014, which claims the benefit of U.S. Provisional Application No. 61/019,757 filed Jan. 8, 2008, all of which are incorporated by reference herein in their entireties.

BACKGROUND

The subject matter described herein relates to vehicles and, more particularly, to control systems for optimizing performance of off-highway vehicles.

Off-highway vehicles (OHV) are used for a plurality of purposes, such as but not limited to haul truck operations in an open pit surface mine. Such off-highway vehicles, including trolley-connected OHVs and other large traction vehicles, are commonly powered by electric traction motors coupled in driving relationship to one or more axles or motor-wheel sets of the vehicle. In the motoring or traction mode of operation, the traction motors are supplied with electric current from a controllable source of electric power, e.g., an engine-driven traction alternator/rectifier/inverter combination or, alternatively, a direct current drive source including a dc motor without an inverter. The traction motors apply torque to the vehicle wheels, which exert tangential force or tractive effort on the surface on which the vehicle is traveling (e.g., a haulage track or road), thereby propelling the vehicle in a desired direction along the right of way.

Conversely, in an electrical (i.e., dynamic) braking mode of operation, the same motors serve as axle-driven/wheel-driven electrical generators. Torque is applied to the motor shafts by their respectively associated axle-wheel sets, which then exert braking effort on the surface, thereby retarding or slowing the vehicle's progress. Because there is no suitable storage medium for the resulting generated electrical energy in a conventional off-highway vehicle or trolley-connected OHV, an electrically resistive grid (known as a dynamic braking grid or load box) is used to convert the electrical energy into heat energy, which is then vented to the atmosphere.

In contrast, hybrid OHVs and hybrid trolley-connected OHVs have the capability of storing the generated dynamic braking energy in a suitable storage element(s), such as batteries, flywheels, ultra-capacitors, and the like. This stored energy may then be used for traction and/or auxiliary systems in the OHV, thereby improving fuel efficiency. However, regardless of whether an OHV includes power storage elements and/or energy dissipative elements, such components contribute to the overall size and weight of the vehicle and thus to the costs of the vehicle. While an operator may be proficient with operating one OHV having a particular size and/or weight, the operator's proficiency may vary OHV to OHV, where the size and/or weight may vary.

Because of differences in OHVs, such as those disclosed above, as well as the skill level, experience, and/or desire of an operator, the costs of operating the OHV and achieving a specific production level may vary greatly. For example, various tests have shown that fuel burn alone can vary up to fifteen percent (15%) based on the operator alone. Considering the various physical configurations of the OHV, the fuel burn may vary further if the operator was to operate to different OHVs in a similar operating mode.

Owners and/or operators of off-highway vehicles, as well as owners of locations where such vehicles are used, such as but not limited to open pit mines, would appreciate the financial benefits realized, such as, but not limited to, a lower cost per ton to the mine, a minimization of burn rate, etc., when optimal OHV operation parameters are utilized, which may further maximize component life of individual components on the OHV.

BRIEF DESCRIPTION

Embodiments described herein relate to a system, method, and a computer readable media for optimizing performance of a powered system. The system includes a data device configured to provide current information about current operating conditions of the powered system and/or prior information about the powered system. The system also includes a controller configured to control operation of the powered system. The system further includes a processor configured to provide at least one control command to the controller for use in operating the powered system and/or user information with at least one recommended command to a user to control the powered system, wherein the at least one control command and/or user information are based at least in part on the current information and/or the prior information.

The method includes determining a performance target for a powered system. The method further includes comparing the performance target to an actual operating parameter of the powered system. The method also includes modifying an actual performance of the powered system to achieve the performance target.

The computer software code is stored on a computer readable media and is executable with a processor. The computer software code includes a computer software module for determining a performance target for the powered system, when executed with the processor. The computer software code further includes a computer software module for comparing the performance target to an actual operating parameter of the powered system, when executed with the processor. The computer software code also includes a computer software module for modifying an actual performance of the powered system to achieve the performance target, when executed with the processor.

BRIEF DESCRIPTION OF THE DRAWINGS

A more particular description of the subject matter briefly described above will be rendered by reference to specific embodiments thereof that are illustrated in the appended drawings. Understanding that these drawings depict only typical embodiments of the invention and are not therefore to be considered to be limiting of its scope, example embodiments of the invention will be described and explained with additional specificity and detail through the use of the accompanying drawings in which.

DETAILED DESCRIPTION

Figure 1:
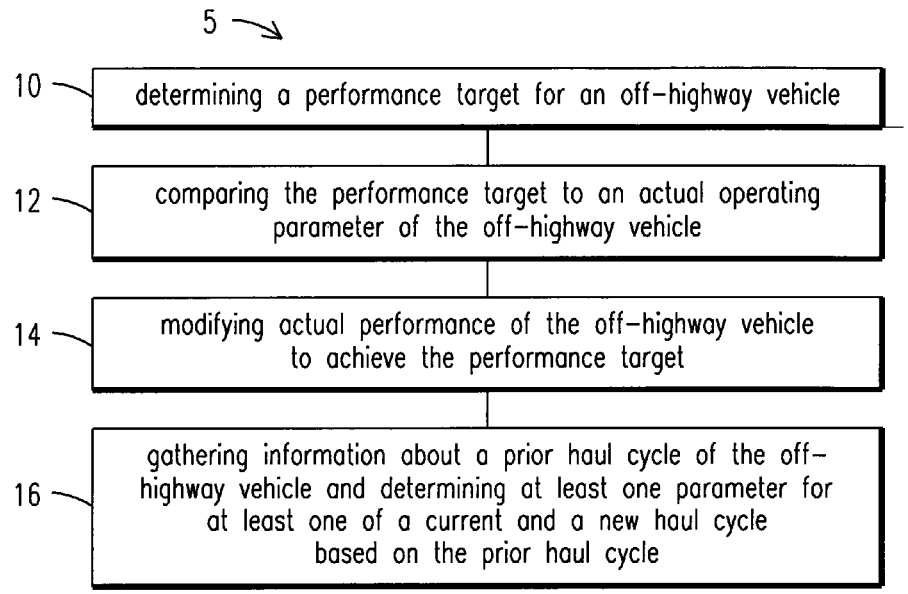
FIG. 1 depicts a flowchart illustrating one embodiment of a method for optimizing operation of an off-highway vehicle.

Reference will now be made in detail to the embodiments consistent with the invention, examples of which are illustrated in the accompanying drawings. Wherever possible, the same reference numerals used throughout the drawings refer to the same or like parts.

Though example embodiments of the present invention are described with respect to off-highway vehicles, embodiments of the invention are also applicable for other uses, such as but not limited to agricultural vehicles, transportation vehicles, stationary power plants, and/or marine vessels, each which may use at least one diesel engine, or diesel internal combustion engine. Towards this end, when discussing a specified mission, this includes a task or requirement to be performed by the diesel powered system. Therefore, with respect to marine vessel applications, this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating conditions of the diesel-fueled power generating station may include one or more of speed, load, fueling value, timing, etc.

In one embodiment involving marine vessels, a plurality of tugs may be operating together where all are moving the same larger vessel, where each tug is linked in time to accomplish the mission of moving the larger vessel. In another exemplary embodiment, a single marine vessel may have a plurality of engines. Off-highway vehicles (OHV) may involve a fleet of vehicles that have a same mission to move earth, from location "A" to location "B," where each OHV is linked in time to accomplish the mission. With respect to a stationary power generating station, a plurality of stations may be grouped together for collectively generating power for a specific location and/or purpose. In another exemplary embodiment, a single station is provided, but with a plurality of generators making up the single station. In one embodiment involving marine vessels, a plurality of diesel powered systems may be operating together where all are moving the same larger load, where each system is linked in time to accomplish the mission of moving the larger load.

Furthermore, although the powered vehicles and other powered systems disclosed herein are usually diesel powered systems, embodiments of the invention may also be utilized with non-diesel powered systems, such as, but not limited to, natural gas powered systems, bio-diesel powered systems, etc. Additionally, such non-diesel powered systems, as well as diesel powered systems, may include multiple engines, other types of power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources. Additionally, the power source may be external, such as, but not limited to, an electrically powered system, where power is sourced externally from overhead catenary wire, third rail, and/or magnetic levitation coils.

Some embodiments of the invention solve the problems in the art by providing a system, method, and computer implemented method, such as a computer software code, for optimizing performance of a powered system, such as but not limited to an off-highway vehicle. Persons skilled in the art will recognize that an apparatus, such as a data processing system, including a CPU, memory, I/O, program storage, a connecting bus, and other appropriate components, could be programmed or otherwise designed to facilitate the practice of the method of the inventive subject matter. Such a system would include appropriate program means for executing the method of the inventive subject matter.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the inventive subject matter.

Broadly speaking, at least one technical effect is to optimize performance of a powered system. To facilitate an understanding of the example embodiments of the inventive subject matter, it is described hereinafter with reference to specific implementations thereof. Example embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that performs particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie some embodiments of the invention can be implemented with other types of computer software technologies as well.

Moreover, example embodiments of the invention may be practiced with other computer system configurations, including hand-held devices, multiprocessor systems, microprocessor-based or programmable consumer electronics, minicomputers, mainframe computers, and the like. Example embodiments of the invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the powered system, or an adjacent powered system in a consist, or off-board in a wayside device or central offices where wireless communication is used.

In this document the term "OHV consist" or "off-highway vehicle consist" is used. As used herein, an OHV consist may be described as having one or more OHVs operating with a trolley in succession, connected together so as to provide motoring capability. Specifically, there can be a lead consist and more than one remote consists. Each OHV consist may have a first OHV and a trail OHV(s), or a trolley at the lead. Furthermore, the term "consist" should be not be considered a limiting factor when discussing multiple OHVs connected together. An OHV consist may relate to a plurality of OHVs operating together where certain physical spacing is expected between each OHV in view of a first location when mined material is placed on each OHV and a second location where the mined material is removed from each OHV.

As disclosed herein, a consist may also be applicable when referring to other diesel powered systems such as, but not limited to, agricultural vehicles, transportation vehicles, stationary power plants, and/or marine propulsion vessels, that operate together so as to provide motoring, power generation, and/or braking capability. Therefore, even though "OHV consist" is used herein, this term may also apply to other diesel powered systems. Similarly, sub-consists may exist. For example, the diesel powered system may have more than one diesel-fueled power generating unit. For example, a power plant may have more than one diesel electric power unit, where optimization may be at the sub-consist level. Likewise, an OHV may have more than one diesel power unit.

Referring now to the drawings, embodiments of the present invention will be described. Example embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 depicts a flowchart illustrating one embodiment of a method for optimizing operation of a vehicle. A performance target for the OHV is determined, at 10, in the flowchart 5. The performance target may be based on a wait time at a station, typically referred to as "time at dump and shovel." The wait time may be a delay time between at least two functions performed by the powered system. A station may include a location where mined material is loaded, or shoveled, onto the OHV and/or a location where the mined material is removed, or dumped, from the OHV. The productivity rate of the OHV may also be considered, e.g., cycles per hour and/or tons hauled per hour. Although dumping and shoveling is disclosed, with respect to other powered systems disclosed herein, dumping and shoveling may be identified as functions being performed by the powered system.

The performance target may further be determined by operating behavior and/or statistics, or statistical information, of the OHV. For example, a propel-braking duty cycle and/or a braking time may be compared to historical data regarding these factors. In another embodiment, a performance target may be determined by a physical position of the OHV in comparison to other OHVs. The distance may be determined by, e.g., a dispatch system, a wayside marker to vehicle measurement, and/or a direct OHV to OHV measurement. The minimum distance to a next OHV, time to the next OHV, and/or OHV spacing on haul route can be controlled. Equally spacing at least two OHVs on haul cycles has the potential of reducing accident risk. This is especially important in mines that have sections of roads that only support a single lane of traffic. Though the term "haul cycle" is discussed herein specific to OHV operations, this term may also relate to a cycle specific to the other powered systems disclosed herein. For example, the haul cycle may relate to a segment of a mission or the time the powered system leave and then returns to a specific location, where it may leave the specific location to transport material and/or living entities.

The performance target may further be determined by environmental conditions. Environmental conditions may include weather conditions, such as but not limited to fog conditions, precipitation conditions, and whether a surface the OHV travels on is slippery (e.g., wheel traction is deemed to be below a designated level). Additionally OHV operating conditions, such as but not limited to degraded operating modes, may also be considered. The degraded operating modes may include both OHV degraded operating modes, such as but not limited to an overheated engine, and degraded environmental conditions, such as but not limited to a degraded road traversed by the OHV between at least two stations.

A comparison of the performance target of the OHV to an actual operating parameter of the OHV is performed, at 12. If there is a difference between the performance target and the operating parameter, a modification is made to the actual performance of the OHV to achieve the performance target of the OHV, at 14. This may be accomplished by adjusting horsepower by either limiting the maximum horsepower produced and/or scaling back the horsepower produced by a gradual percentage until the target performance is met. If the horsepower is too low, it may be boosted. The horsepower may also be boosted to meet the performance target when environmental conditions are not ideal. For example, the horsepower of the OHV may be boosted to traverse a soft spot on the ground on which the OHV is traveling so that momentum is not lost.

Figure 3:
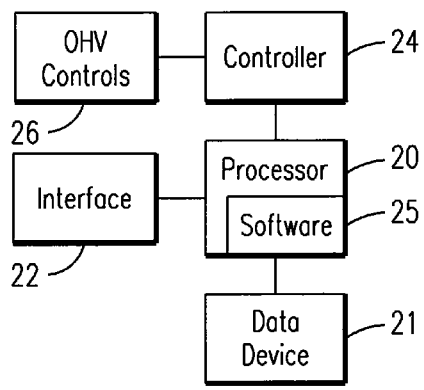
FIG. 3 depicts a block diagram illustrating one embodiment of elements used in optimizing operation of a vehicle.

Modifying performance may also be accomplished by reducing the speed of the OHV, such as but not limited to limiting maximum speed and/or reducing OHV speed over an entire haul cycle. A dynamic OHV speed limit may be compared to a position of the OHV in the haul cycle. For example, when controlled by an operator, the horsepower and OHV speed may be controlled by informing the operator of a target speed and allowing the operator to keep full control of the vehicle. When horsepower and speed are controlled by an autonomous controller, as illustrated in FIG. 3, the autonomous controller commands the operation of the OHV.

In another embodiment, the modification to the OHV performance is accomplished based on learning a haul cycle of the OHV. More specifically, information about a prior haul cycle is gathered, or accessed, and a determination about at least one parameter for a new or current haul cycle is made based on the prior haul cycle, at 16. Subsequently, the OHV is controlled during the new, current, or a subsequent haul cycle based in part on the parameter. The haul cycle may be learned based on operational history, such as, but not limited to, averaged or weighted data based on past haul cycles. Using this information may allow for a slow change of route. In another example, the haul cycle may be indexed against time and/or position. Position and/or time may be integrated from speed based from hard points of shovel and dump. Additionally the difference between a left wheel on the OHV and a right wheel on the OHV may be used to estimate curvature of the road which can be used to identify a haul profile, which may be used to further optimize the performance of the OHV. Other information that may be used to learn the haul cycle may include stop points and/or fixed wayside points, changes in surface grade and how the OHV performs when the grade is changed, utilization of GPS coordinates, etc.

The haul cycle may also be defined based on a deviation from historical cycle information. For example, multiple stored cycle information may be selected based on correlation to present operations. The current haul cycle may be selected from a set of possible cycles based on operator and/or dispatch system input.

The flowchart 5 may be implemented with a computer software code that is storable on computer media and is operable with a processor 20, disclosed in detail below, where particular elements in the flowchart 5 are implemented with computer software modules. More specifically, the computer software code includes a computer software module for determining a performance target for the powered system, when executed with the processor. Also included is a computer software module for comparing the performance target to an actual operating parameter of the powered system, when executed with the processor. A computer software module is also included for modifying an actual performance of the powered system to achieve the performance target, when executed with the processor. The computer software code also includes a computer software module for gathering information about at least one function of the powered system and determining at least one parameter for a new performance of the at least one function based on a prior performance of the at least one function, when executed with the processor. With respect to an OHV, the at least one function may be associated with a haul cycle.

Figure 2:
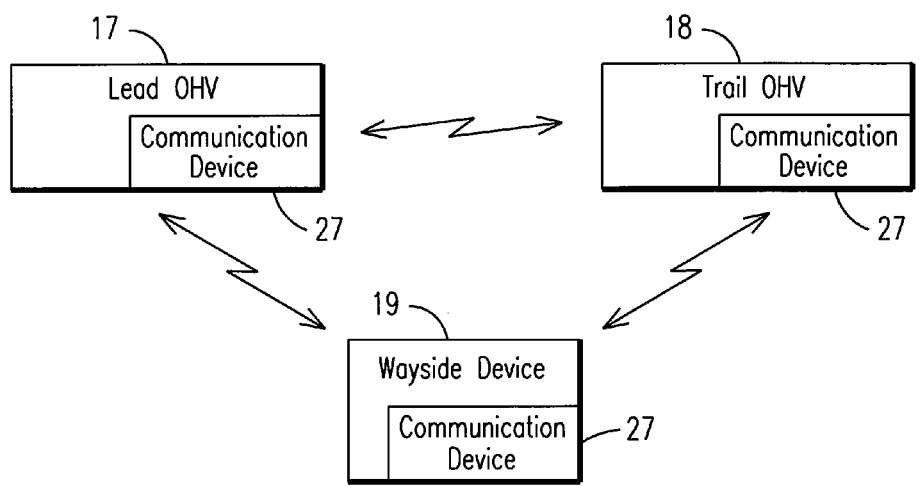
FIG. 2 depicts a block diagram illustrating one embodiment of vehicles obtaining information from each other.

By using one or more of the embodiments disclosed above, improved performance of a fleet of powered systems may be realized. For example, with respect to a fleet of OHVs at a mine site, reduced fuel burned, minimizing collisions, etc., may be improved. Such improvements are further possible by using information or feedback from other powered systems in the same vicinity. The type of feedback is not limited, but it may include performance information from the other OHVs working the same mine. As illustrated in FIG. 2, the performance target may be based on information obtained from the other powered system in the same vicinity. For example, if two OHVs are following each other, a performance target from the lead OHV 17 is communicated, wirelessly, to the trailing OHV 18. In other exemplary embodiment, if a wayside device 19 is passed on a route, the lead OHV 17 may provide the performance target to the wayside device 19, which in turn transmits the information to the trailing OHV 18 when the trailing OHV 18 is within communication range of the wayside device 19. To facilitate this operation, a communication device 27 is on each OHV 17, 18, and/or the wayside device 19. Those skilled in the art will readily recognize that more than two powered systems may be utilized to provide the performance target for a specific powered system.

FIG. 3 depicts a block diagram illustrating one embodiment of a system used in optimizing operations of a vehicle. The system includes a processor 20. Software 25 (computer-readable instructions) is operable with the processor. The processor 20 and software 25 may be used to determine a performance target for the OHV. Data and/or information are provided to the processor, and hence to the software 25, through a data device 21. The data device 21 may include a plurality of devices such as, but not limited to, sensors located on the OHV, the mine dispatch system, and/or a database that retains historical operating information. The processor 20 and software 25 may also be used to compare the performance target for the OHV to an actual operating parameter of the OHV, and to modify the actual performance of the OHV to achieve the performance target for the OHV. In one embodiment, the results realized from modifying the actual performance to achieve the performance target is communicated to the operator by way of an interface 22, or display, as disclosed below with respect to FIG. 5. In another embodiment, the results are provided to an autonomous controller 24, as disclosed above, which in turn provides command signals to controls 26 the OHV 17. More specifically, when the computer-readable instructions in the software 25 are executed by the processor 20, the processor 20 is able to provide commands to the controller 24 to use in operating the off-highway vehicle and/or commands to an operator aboard the off-highway vehicle through the interface 22.

Example embodiments of the invention may influence performance and/or speed, such as but not limited to boost, limit or provide target speed to minimize fuel burn and operating cost while maximizing component life. This may be as simple as dynamically lowering horsepower if wait time at either end of the haul, shovel, or dump, exceed a target. As disclosed above, it may be as complex as controlling spacing of the OHVs or defining a specific target speed profile for the entire haul cycle to minimize energy use. Example embodiments of the invention are flexible so that many different inputs may be utilized. Example inputs include simple operation history available locally to the propulsion controller, interaction with a mine dispatch system, and/or autonomous OHV controller information. Example embodiments of the invention may either actively control the speed and/or horsepower of the OHV, and/or influence a driver's operation with target speed annunciation. Towards this end, an example embodiment of the invention may be used to uniformly space a plurality of OHVs and/or ultimately control a rate of mine output.

Figure 4:
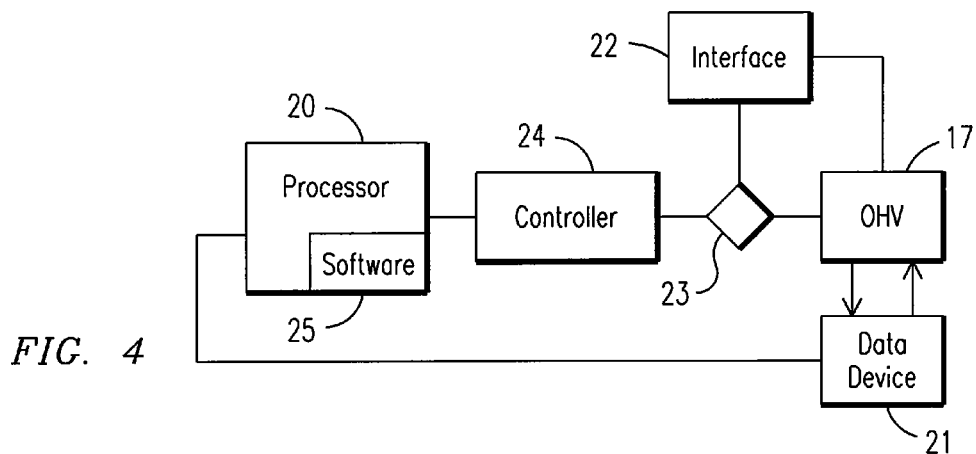
FIG. 4 depicts a block diagram illustrating one embodiment of a closed-loop system for optimizing operation of a vehicle.

FIG. 4 depicts one embodiment of a closed-loop system for optimizing operation of a vehicle. As disclosed, information from the data device 21 is collected from an OHV 17 and is provided to the processor 20, which in turn provides the information to the software 25. When a new operation setting is determined, it is provided to the controller 24. If the controller 24 is configured to operate the OHV 17, the controller 24 will implement the new operation setting. If the controller 24 is not configured to operate the OHV 17, the new operation setting is provided to an operator such as, but not limited to, through the interface 22. A decision gate 23 is shown to identify where this decision is made. The operator can use the interface 22 to provide commands to the OHV 17. When the controller is operating the OHV 17, the OHV 17 and/or the controller 24 can provide information about the operation settings to the operator through the interface 22. Though FIG. 4 depicts an embodiment of a closed-loop configuration, other closed-loop configurations are possible.

Figure 5:
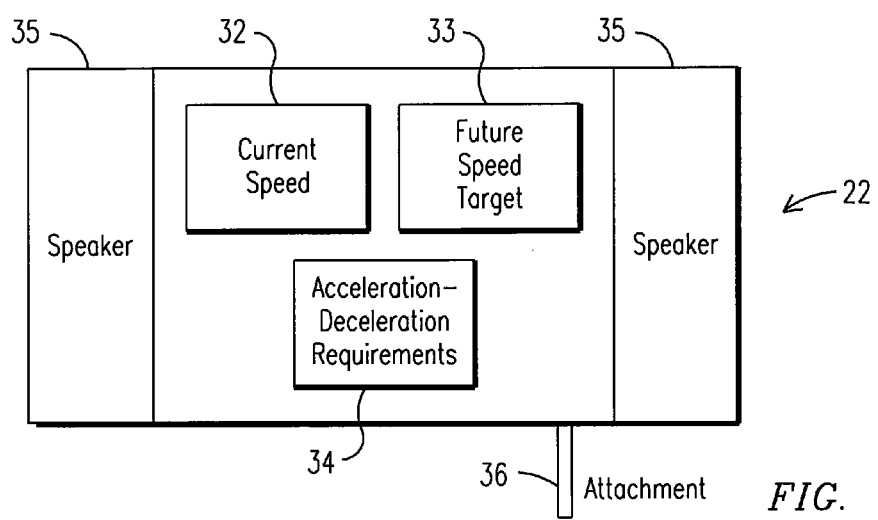
FIG. 5 depicts one embodiment of an interface within a vehicle.

FIG. 5 depicts an embodiment of an interface within a vehicle. The flowchart 5 disclosed in FIG. 1 may be implemented either autonomously, more specifically with little to no operator interface, and/or with operator interface where the method disclosed above is used to provide recommendations to the operator. Where recommendations are provided to the operator, an interface 22 is provided to the operator. In one embodiment, the interface 22 provides the operator with information, through visual indicators, about at least one of speed at a first visual indicator 32 (actual and/or target speed), future speed targets at a second visual indicator 33, and/or acceleration/deceleration requirements at a third visual indicator 34.

Since operators of OHVs, such as but not limited to mine truck drivers, must concentrate on the road and the surrounding environment, minimum visualization of the interface is preferred. Towards this end, information may be communicated to the operator through visual indicators 32, 33, 34 as well as audile indicators 35. For example, visual information may include a target speed compared with actual speed (including speed targets) in a form of a digital display and/or graph, such as but not limited to a line graph versus time. Additionally, acceleration requirements to achieve the target speed may be displayed in the form of arrows of various lengths. In another embodiment, acceleration/deceleration requirements may be presented audibly in the form of beeps that increase in frequency as the operator deviates from the target speed. Information provided audibly may occur through speakers 35 and/or through a speaker headset worn by the operator. The speaker headset may be wired and/or wireless.

In another embodiment, information may be communicated through a physical touch. For example, instead of acceleration/deceleration requirements being presented audibly, an electrical current applied to a skin area of the operator may be used. An attachment 36 is provided for connection to the operator. In an embodiment, the electrical current applied to the skin area may only be used when deceleration requirements must be communicated but only when the audible indicators are ignored and where failure to decelerate may result in a dangerous operating condition. Other options include providing tactile feedback through operator controls.

While the inventive subject matter has been described herein with reference to various embodiments, it will be understood by those of ordinary skill in the art that various changes, omissions and/or additions may be made and equivalents may be substituted for elements thereof without departing from the spirit and scope of the inventive subject matter. Additionally, many modifications may be made to adapt a particular situation or material to the teachings of the inventive subject matter without departing from the scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims. Moreover, unless specifically stated any use of the terms first, second, etc., do not denote any order or importance, but rather the terms first, second, etc., are used to distinguish one element from another.

What is claimed is:

1. A method comprising:
   determining a performance target for a vehicle having plural wheels for driving along a road;
   comparing the performance target to an actual operating parameter of the vehicle;
   modifying an actual performance of the vehicle to achieve the performance target;
   obtaining information from at least one prior haul cycle of the vehicle along the road based on learning the at least one prior haul cycle of the vehicle;
   determining at least one parameter for at least one current haul based on the information from the at least one prior haul cycle that is obtained; and
   controlling the vehicle during the at least one current haul cycle using the at least one parameter.

2. The method according to claim 1, wherein determining the performance target further comprises determining a wait time between at least two functions performed by the vehicle.

3. The method according to claim 1, wherein determining the performance target further comprises determining a productivity rate of the vehicle.

4. The method according to claim 1, wherein modifying the actual performance further comprises adjusting one or more of horsepower or speed of the vehicle.

5. The method according to claim 4, wherein adjusting the one or more of the horsepower or the speed is performed automatically.

6. The method according to claim 1, further comprising adjusting the actual performance of the vehicle to compensate for at least one environmental condition.

7. The method according to claim 1, wherein determining the performance target is accomplished by obtaining information from at least one other vehicle performing a same or similar mission as the vehicle.

8. The method according to claim 1, wherein determining the performance target further comprises determining operating behavior of the vehicle.

9. The method according to claim 1, wherein determining the performance target further comprises determining statistical information of the vehicle.

10. The method according to claim 1, wherein determining the performance target further comprises comparing a position of the vehicle to at least one other vehicle.

11. The method according to claim 1, wherein determining the performance target further comprises determining environmental conditions experienced by the vehicle.

12. The method according to claim 1, wherein determining the performance target further comprises determining a degraded operating mode that the vehicle is experiencing.

13. The method according to claim 1, wherein determining the performance target further comprises comparing at least one prior mission to a current mission of the vehicle.

14. The method according to claim 1, wherein the performance target is a delay time between loading material onto the vehicle and removing the material from the vehicle.

15. The method according to claim 1, wherein the performance target is determined by comparing a braking duty cycle of the vehicle to a historical braking duty cycle.

16. The method according to claim 1, wherein the information obtained from the at least one prior haul cycle of the vehicle is learned based on one or more of averaged or weighted data of the vehicle during the at least one prior haul cycle.

17. The method according to claim 1, wherein the information obtained from the at least one prior haul cycle of the vehicle is learned by determining a change in a surface grade and determining how the vehicle performed over the change in the surface grade during the at least one prior haul cycle.

18. The method according to claim 1, wherein one or more of determining the performance target, comparing the performance target to the actual operating parameter, modifying the actual performance of the vehicle, obtaining the information from the at least one prior haul cycle, determining the at least one parameter for the at least one current haul cycle, or controlling the vehicle is performed with one or more processors.

19. The method according to claim 1, further comprising displaying a result from modifying the actual performance of the vehicle on an interface of the vehicle.

20. A method comprising:
    determining a performance target for a vehicle having plural wheels for driving along a road;
    comparing the performance target to an actual operating parameter of the vehicle;
    modifying an actual performance of the vehicle to achieve the performance target;
    obtaining information from at least one prior mission of the vehicle along the road based on learning the at least one prior mission of the vehicle;
    determining at least one parameter for at least one current mission based on the information from the at least one prior mission that is obtained; and
    controlling the vehicle during the at least one current mission using the at least one parameter.

* * * * *